US010353980B2

(12) United States Patent
Hochreuter et al.

(10) Patent No.: US 10,353,980 B2
(45) Date of Patent: Jul. 16, 2019

(54) CLIENT-SIDE PAGING FOR HIERARCHY DATA STRUCTURES IN RESTFUL WEB SERVICES

(71) Applicant: SAP SE, Walldorf (DE)

(72) Inventors: Thorsten Hochreuter, Ludwigshafen (DE); Sebastian Ried, Walldorf (DE); Jiawei Cao, Nussloch (DE)

(73) Assignee: SAP SE, Walldorf (DE)

( * ) Notice: Subject to any disclaimer, the term of this patent is extended or adjusted under 35 U.S.C. 154(b) by 451 days.

(21) Appl. No.: 15/364,803

(22) Filed: Nov. 30, 2016

(65) Prior Publication Data

US 2018/0150568 A1    May 31, 2018

(51) Int. Cl.
*G06F 16/00* (2019.01)
*G06F 16/957* (2019.01)
*G06F 16/954* (2019.01)
*G06F 16/9535* (2019.01)
*H04L 29/08* (2006.01)

(52) U.S. Cl.
CPC ........ *G06F 16/9577* (2019.01); *G06F 16/954* (2019.01); *G06F 16/9535* (2019.01); *H04L 67/02* (2013.01)

(58) Field of Classification Search
CPC ............... G06F 16/9535; G06F 16/954; G06F 16/9577; H04L 16/02
See application file for complete search history.

(56) References Cited

U.S. PATENT DOCUMENTS

| 8,209,353 | B2 | 6/2012 | Krishnamurthy |
| 8,326,857 | B2 * | 12/2012 | Bolsius ................. G06F 16/243 707/765 |
| 8,799,315 | B2 | 8/2014 | Kutsch et al. |
| 8,825,700 | B2 | 9/2014 | Cuneo et al. |
| 8,887,099 | B1 | 11/2014 | Simeloff |
| 9,087,138 | B2 * | 7/2015 | Zhou ........................ G06F 16/00 |
| 2007/0073734 | A1 * | 3/2007 | Doan ...................... G06F 16/83 |
| 2010/0067113 | A1 | 3/2010 | Harrison |
| 2015/0066841 | A1 | 3/2015 | Egen |

OTHER PUBLICATIONS

P. Dadam, K. Kuespert, F. Andersen, H. Blanken, R. Erbe, J. Guenauer, V. Lum, P. Pistor, G. Walch, "A DBMS Prototype to Support Extended NF2 Relations: An Integrated View on Flat Tables and Hierarchies", ACM, pp. 356-367. (Year: 1986).*

* cited by examiner

*Primary Examiner* — Cheryl Lewis
(74) *Attorney, Agent, or Firm* — Schwegman Lundberg & Woessner, P.A.

(57) ABSTRACT

In an example embodiment, an efficient paging algorithm is provided. A first request for hierarchical data is generated and sent to a backend located on a server device. A first flattened table containing hierarchical data responsive to the first request is received from the server device, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree. One or more paging parameters are created based on one or more of the magnitude values. A second request for hierarchical data is generated based on the one or more paging parameters and sent to the backend. A second flattened table containing hierarchical data responsive to the second request is received.

20 Claims, 8 Drawing Sheets

FIG. 1

| | Name | Description |
|---|---|---|
| A | ∨ Rock | Rockmusik |
| C | ∨ Rockn'Roll | late 1940s |
| F | Elvis Presley | *1935 - †1977 |
| G | Chuck Berry | *1926 |
| H | Keith Richards | *1943 |
| D | ∨ Heavy Metal | late 1960s |
| I | Back Sabbath | founded 1968 |
| J | Judas Priest | founded 1968 |
| E | ∧ Grunge | Mid-1980s |
| B | ∨ Hip-Hop | Hip-Hop |

| ID | Parent Node | Level |
|---|---|---|
| A | root | 0 |
| C | A | 1 |
| H | C | 2 |
| I | C | 2 |
| J | C | 2 |
| D | A | 1 |
| K | D | 2 |
| L | D | 2 |
| Q | L | 3 |
| R | L | 3 |
| E | A | 1 |
| B | root | 0 |
| F | B | 1 |
| M | F | 2 |
| N | F | 2 |
| S | N | 3 |
| T | N | 3 |
| G | B | 1 |
| O | G | 2 |
| P | G | 2 |

CLIENT-SIDE PAGING FOR HIERARCHY DATA STRUCTURES IN RESTFUL WEB SERVICES

TECHNICAL FIELD

This document generally relates to methods and systems for use with memory paging in computer systems. More particularly, this document relates to a client-side paging for hierarchy data structures in RESTful web services.

BACKGROUND

When building Internet-enabled software applications, such as web applications, it is desirable to minimize the network traffic and amount of workload performed on the client, as the client device is typically of limited processing power, at least with respect to the processing power of a server or servers. Web application frameworks often opt for a stateless approach to keep the coupling between front-end and backend implementations as minimal as possible. This is also enforced by the underlying protocol (commonly, HyperText Transfer Protocol, or HTTP) and the notion of a RESTful web-service. Representational State Transfer (REST) is an architectural style used for web development designed for fast performance, reliability, and the ability to scale. To achieve these goals, developers work with reusable components that can be managed and updated without affecting the system as a whole while it is running. One example of a stateless web-application framework supporting RESTful web-services is SAPUI5™ from SAP SE, of Walldorf, Germany. RESTful services are commonly implemented based on the OData protocol.

No matter how loosely the front-end and the backend are coupled, web applications still need to load data from the backend in order for it to be displayed. This is normally performed via web services. Since it is not feasible to load all data in one pass, due to size, network, and database load, a paging algorithm is utilized. A paging algorithm loads data points only as they are needed, as much as possible.

An issue that arises, however, is that paging algorithms are designed for list-based data, namely a sequential or non-sequential listing of data records or other items of data. Such naive paging algorithms are not feasible for hierarchical data structures. Such hierarchical data structures are useful for storing data that resides on multiple "levels". For example, a group of information regarding musical bands may have a top level indicating the genre of the band, then a second level indicating the sub-genre of the band, and then a lower level indicating the band name. While this type of organization is useful for hierarchical-based navigation (e.g., where the user wishes to explore bands in certain genres or sub-genres, he or she can select the genre first, then see a list of sub-genres within the genre, then select on a sub-genre and see a list of bands in the sub-genre), it creates a technical problem for naive paging algorithms.

BRIEF DESCRIPTION OF DRAWINGS

The present disclosure is illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a transient field called "magnitude" is added to a hierarchical data structure for each record. Since each record corresponds to a node in a corresponding tree conceptualization of the hierarchical data structure, it becomes possible to track a magnitude for each node in the tree. This magnitude is a measurement of the total number of entries in a sub-tree underneath the node, while respecting all side-constraints such as filter and/or search conditions. The magnitude field allows the paging algorithm to page an initially expanded tree. Since the magnitude also allows the paging algorithm to find the correct starting point for paging operations in cases where a sub-tree is collapsed, the magnitude can be used to calculate the correct paging parameters to skip the entire collapsed sub-tree, thus reducing the workload on a user interface (UI) layer of a client.

Figure 1:
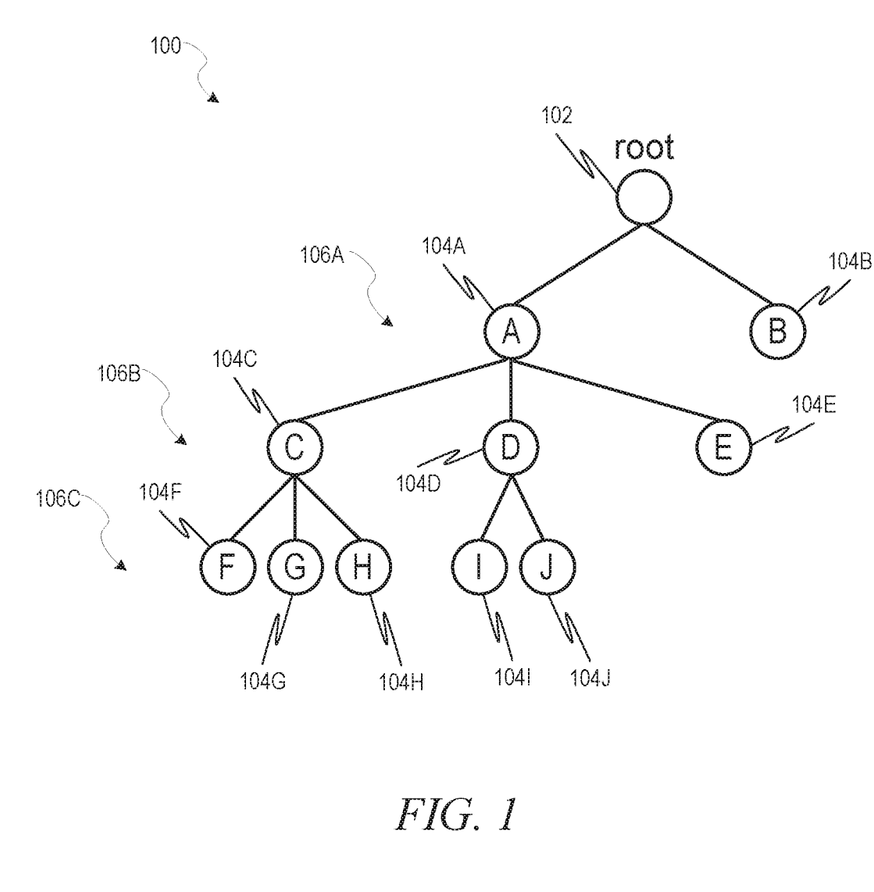
FIG. 1 is an example of a tree representation of band information in accordance with an example embodiment.
Figure 2:
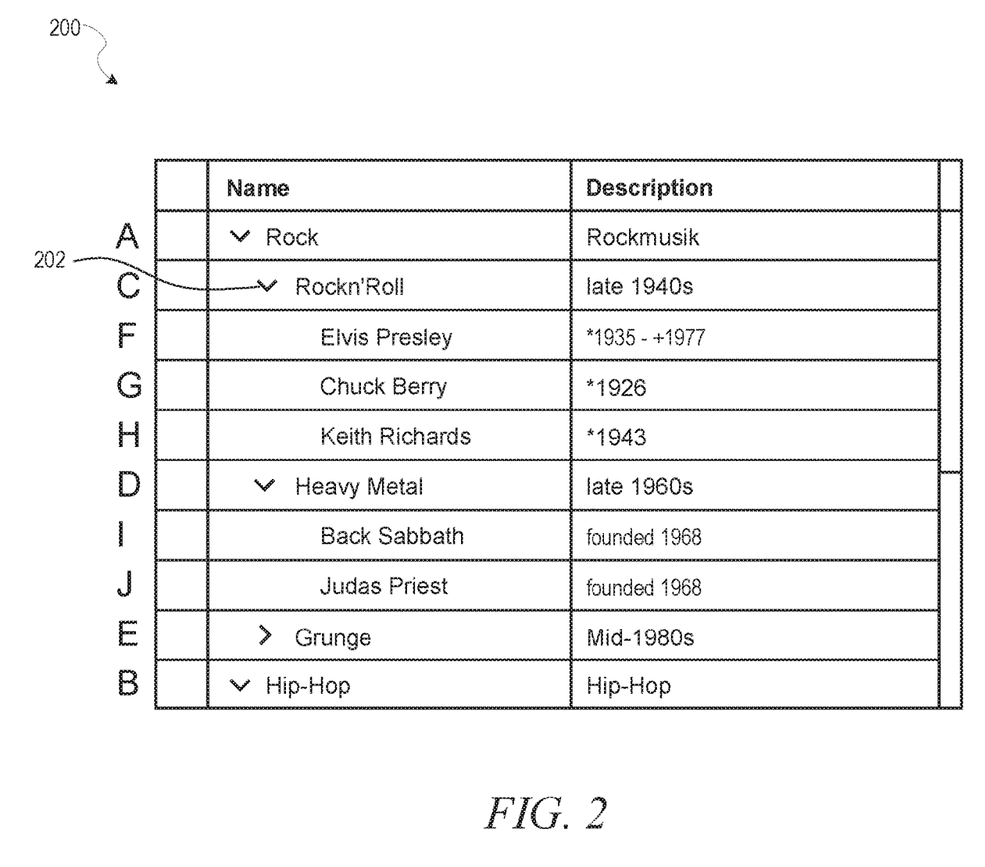
FIG. 2 is an example of a tree table control in accordance with an example embodiment.

FIG. 1 is an example of a tree representation of band information in accordance with an example embodiment. Here, as can be seen, the tree 100 has a root 102, as well as various nodes 104A-104J, on three different levels 106A-106C. If the entire tree 100 is flattened for display, the tree 100 is traversed depth-first in pre-order. FIG. 2 is an example of a tree table control 200 in accordance with an example embodiment. This tree table control 200 may be displayed, for example, in a user interface to a user. Nodes at a higher level than the lead node may include an arrow control, e.g., reference numeral 202, which allows a user to expand or collapse the node, revealing or hiding the next level of nodes below the node. Here, the entire tree 100 is depicted in the tree table control 200 as all the nodes have been expanded. However, users typically do not begin by viewing the hierarchical data with all nodes expanded, and even if they wanted to do this, it is often infeasible for as computer displays are limited in the amount of data that can be displayed at any one time, and most hierarchies of any interest are so large as to be infeasible to display all at once on a single screen.

Rather, users typically begin navigation at just the top level of the hierarchy, selecting a node in the top level of the hierarchy to expand it, revealing the next level of the hierarchy, selecting a node in the next level of the hierarchy, revealing the next level of the hierarchy, and so on, until a selection on the bottom level of the hierarchy is made. In between the selections to expand nodes, the user may also "change his mind" or otherwise decide to explore a different path, and select a node to collapse the next level of the hierarchy before selecting an alternative node in the level to expand.

A naive paging algorithm would simply request the data corresponding to the next level of the hierarchy when a node on one level of the hierarchy is expanded, and remove that data from a client when that node is collapsed. This approach implies that the connection between nodes, respectively foreign key associations, are manifested in the data set, e.g., by ID-reference. In a RESTful service, this is typically modeled by a uniform resource locator (URL) link. In addition, the data set needs to expose the level on which a certain node resides, either defined in the raw data or dynamically calculated by the web service.

Figure 3:
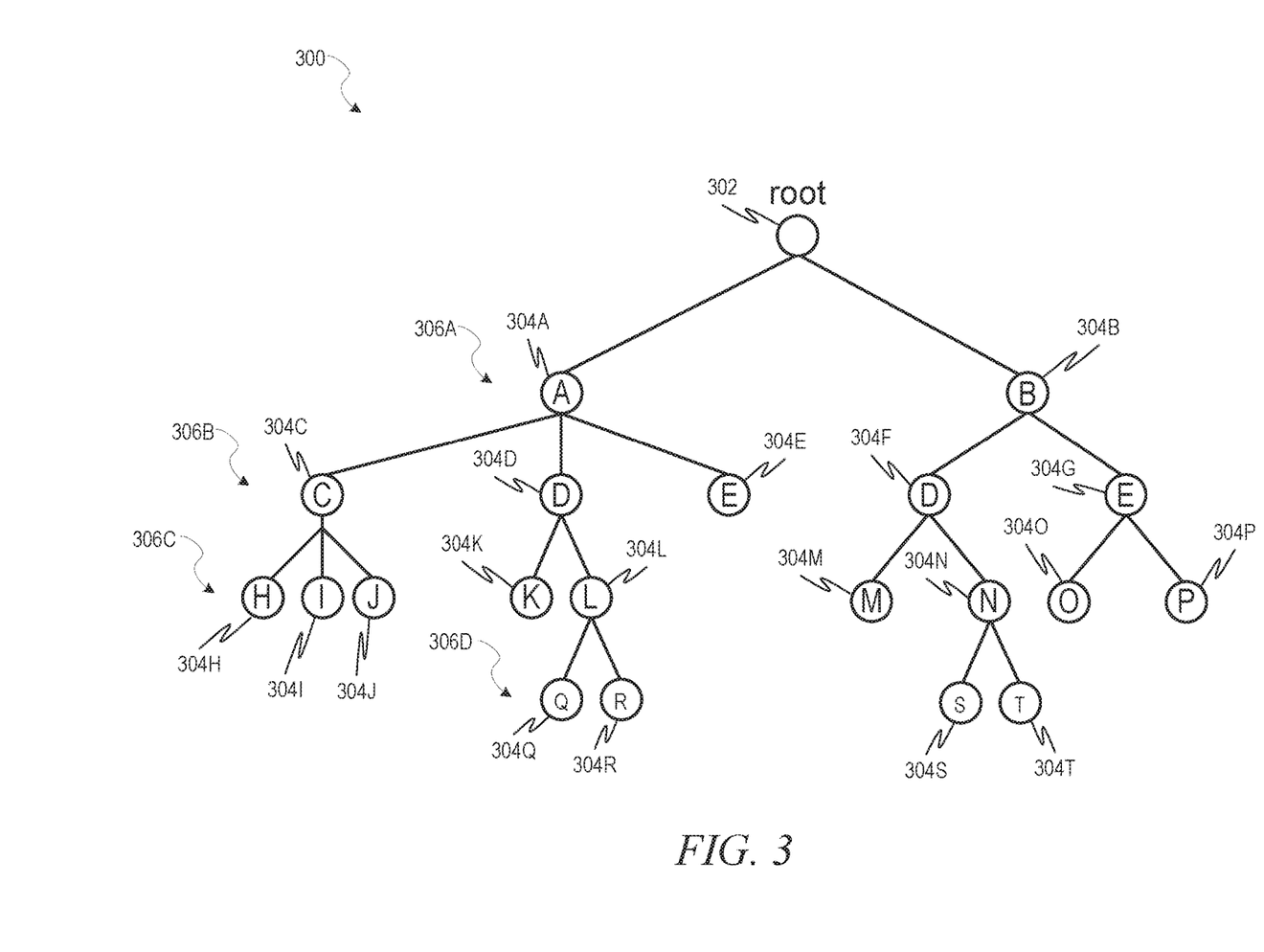
FIG. 3 depicts an exemplary tree structure in accordance with an example embodiment.
Figure 4:
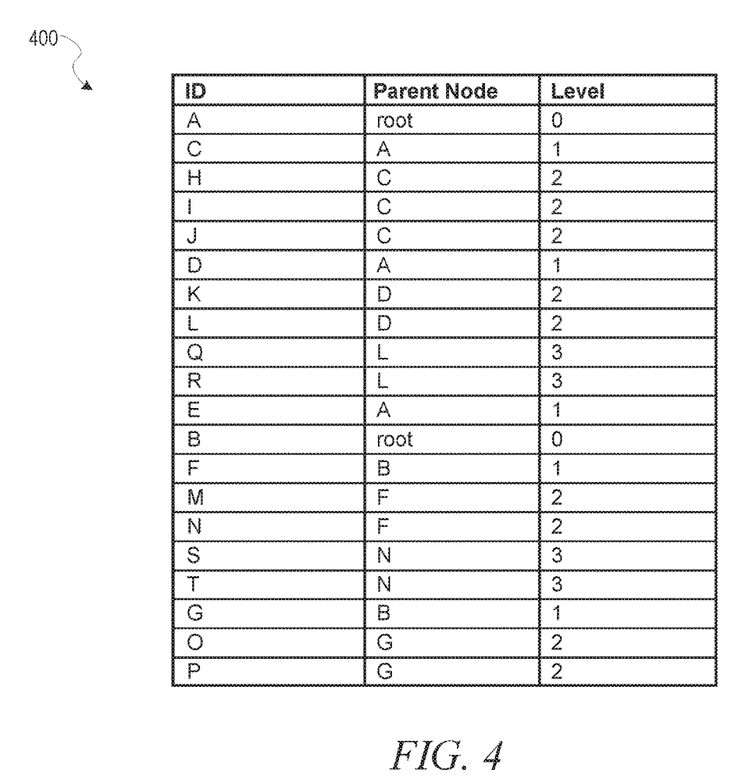
FIG. 4 depicts an example flattened database table containing foreign key associations and level information in accordance with an example embodiment.

FIG. 3 depicts an exemplary tree structure 300 in accordance with an example embodiment. The tree structure 300 includes a root 302 and nodes 304A-304T on four different levels 306A-306D. FIG. 4 depicts an example flattened database table 400 containing foreign key associations and level information in accordance with an example embodiment. The flattened database table 400 corresponds to the tree structure 300 of FIG. 3.

A sample OData request to load the top-level nodes would look like:
GET http://my.service.com/treeDataSet? $filter=Level EQ 0
with the result being Table 1 below:

TABLE 1

| ID | Parent Node | Level |
|----|-------------|-------|
| A  | root        | 0     |
| B  | root        | 0     |

When expanding the node A, a subsequent backend result would look like:
GET http://my.service.com/treeDataSet? $filter=Parent EQ 'A'
with the result being Table 2 below:

TABLE 2

| ID | Parent Node | Level |
|----|-------------|-------|
| C  | A           | 1     |
| D  | A           | 1     |
| E  | A           | 1     |

With this naive approach, it is necessary to send a separate backend request for every expanded node. If initially the tree is expanded to a fixed level, for example, two levels down, this results in an unknown number of backend requests, perhaps for data that cannot even be displayed on a limited-size display. Depending on the depth of the tree, the initial expand level, and the total number of nodes, this can result in a severe performance bottleneck. Even for a small number of data points, such as a thousand, this approach is not feasible.

In an example embodiment, two mechanisms are added in order to improve the naive paging algorithm described above. First, data points should be returned to the client in preorder (depth-first sorted). This is fulfilled by sorting the entries in the backend system, as here all data points are known and can be handled. This is technically infeasible for the front-end client to perform, because of partial and incompletely loaded sets of data points. Second, a dynamically calculated field is added in the service implementation. This dynamically calculated field is transient and is called "magnitude." The magnitude field enables a paging algorithm to lead the tree in a flat serialized manner. In addition, standard hierarchical navigation operations, such as expanding and collapsing, can be performed without a performance hit.

As described above, the magnitude function of a node X can be defined as the total number of all entries in the sub-tree underneath the node X, with respect to side-constraints such as filter and/or search condition. For example, if the user performs a search that results in only a portion of a tree satisfying the search query, then only the portion of the tree satisfying the search query is included in the magnitude calculation. Likewise, if the user performs a filtering operation that results in only a portion of a tree satisfying the filter, then only the portion of the tree satisfying the filter is included in the magnitude calculation.

The magnitude is calculated based on the raw data set available in the backend system, so changing the domain of the magnitude function will also result in a change of the co-domain, respectively.

Equation 1 below shows the formally expressed calculation algorithm for the magnitude function, where the function childCount(X) evaluates to the total number of direct children for the given node X. X[i] addresses the i-th direct child node of node X.

$$mag(x) = childCount(x) + \sum_{i=0}^{childCount(x)} mag(x[i]) \quad \text{Equation 1}$$

Thus, the tree structure 300 in FIG. 3 will have the following magnitude values:
for the nodes A, C, D and E are: mag(A)=10 mag(C)=3 mag(D)=4 mag(E)=0

With the definition given in Equation 1, the magnitude for node A can also be expressed like this: mag(A)= childCount(A)+mag(C)+mag(D)+mag(E)=3+3+4+0=10

As mentioned above, the magnitude calculation regards the given filter and search conditions and constraints, but only as long as they affect the actual hierarchy. A sorting operation, for example, is not relevant as it only changes the order but not the actual hierarchy. For a level filter, however, the tree is pruned at the given level.

Thus, a level-filtered request such as GET http://my.service.com/treeDataSet? $filter=Level LE 2 results in table 3 as follows:

TABLE 3

| ID | Parent Node | Level | Magnitude |
|---|---|---|---|
| A | root | 0 | 8 |
| C | A | 1 | 3 |
| H | C | 2 | 0 |
| I | C | 2 | 0 |
| J | C | 2 | 0 |
| D | A | 1 | 2 |
| K | D | 2 | 0 |
| L | D | 2 | 0 |
| E | A | 1 | 0 |
| B | root | 0 | 6 |
| F | B | 1 | 2 |
| M | F | 2 | 0 |
| N | F | 2 | 0 |
| G | B | 1 | 2 |
| O | G | 2 | 0 |
| P | G | 2 | 0 |

With respect to the given filter ("Level<=2"), the tree is pruned at level 2, and the magnitude is adapted accordingly. The magnitude for node A, for example, is now 8 instead of 10, as the nodes Q and R are not regarded based on the filter condition.

Adding paging parameters to the previous example will make the request as follows:
GET http://myservice.com/treeDataSet? $filter=Level LE 2 & $skip=5 & Stop=5
resulting in the table 4 below:

TABLE 4

| ID | Parent Node | Level | Magnitude | Index |
|---|---|---|---|---|
| D | A | 1 | 2 | 5 |
| K | D | 2 | 0 | 6 |
| L | D | 2 | 0 | 7 |
| E | A | 1 | 0 | 8 |
| B | root | 0 | 6 | 9 |

With the additional paging parameter, the flattened and initially expanded tree can be paged sequentially to the client. In a tree-based UI control such as a tree table, this allows the client to load only the data points that are needed for the currently visualized part. For example, if the client UI only has the ability to show five entries in a window, the client can modify the request accordingly. In the request above, this means that the client can request to skip the first five entries in the table and stop retrieving after the next five. In this use-case, the paging parameters correspond to the scroll position and the number of visible rows.

Figure 5:
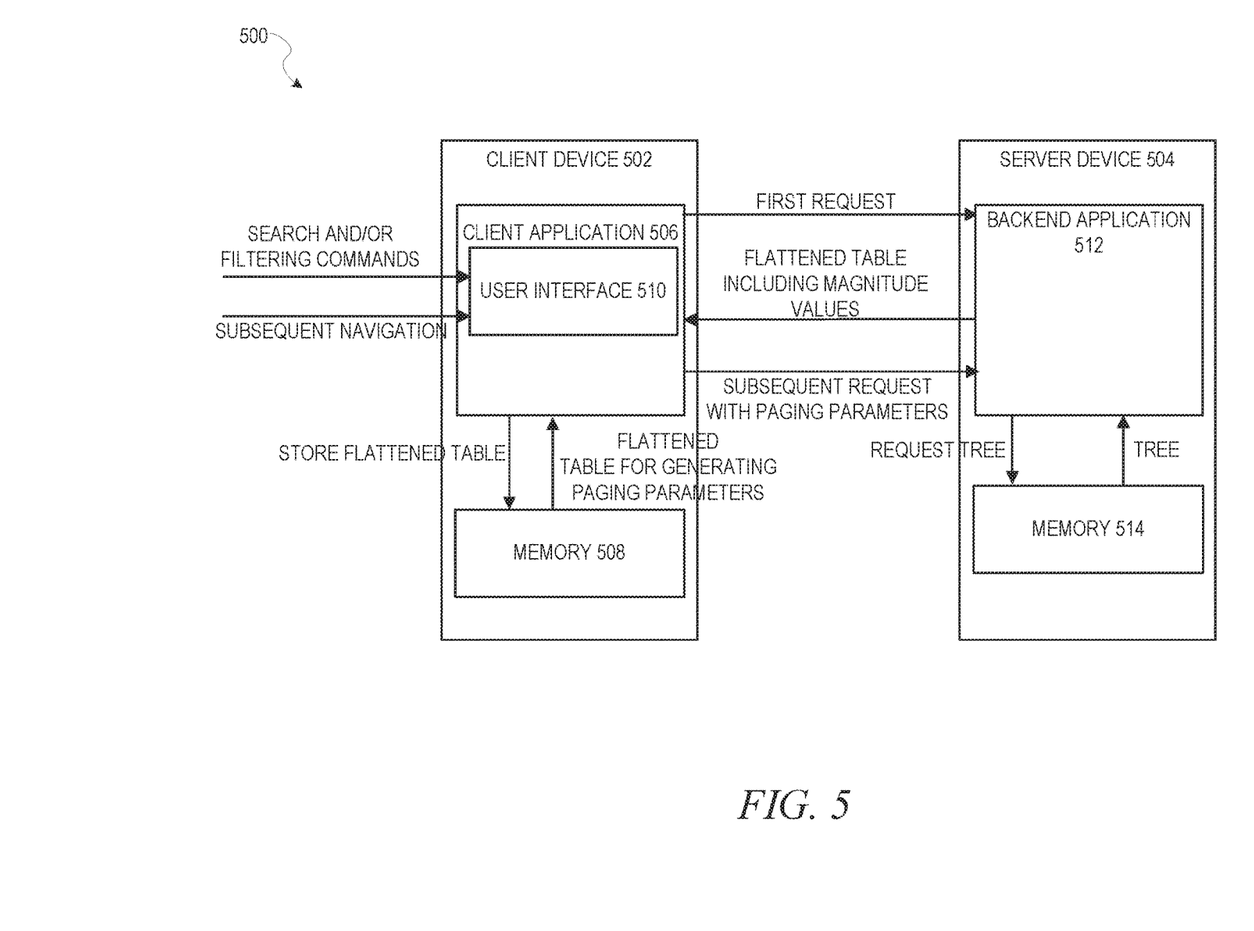
FIG. 5 is a block diagram illustrating a system in accordance with an example embodiment.

FIG. 5 is a block diagram illustrating a system 500 in accordance with an example embodiment. The system 500 includes a client device 502 and a server device 504. Both the client device 502 and the server device 504 could be any type of computing device, including smartphones, tablets, laptop computers, desktop computers, server blades, etc. For illustrative purposes, however, the client device 502 maybe a low-processing power device such as a smartphone and the server device 504 could be a high-processing power device such as a server blade.

The client device 502 includes a client application 506 and a memory 508. The client application 506 may be any application designed to utilize hierarchical data obtained from the server device 504, although in example embodiments the client application 506 will include a user interface 510 designed to display hierarchical data obtained from the server device 504. The user interface 510 is also designed to accept navigation commands from a user via a user input device, such as a mouse, touchscreen, keyboard, etc. These navigation commands may include commands to expand or collapse a node in the hierarchical data. The user interface 510 is also designed to accept search and/or filtering commands from a user, also via the user input device.

The client application 506 uses the search and/or filtering commands to generate an initial request for hierarchical data from the server device 504. Notably, the initial request can also be generated based on one or more display parameters of the client application 506, such as the display or window size. The client application 506 then sends this request to a backend application 512 running on the server device 504. The request may include, for example, an identification of the hierarchical data desired and one or more search and/or filtering parameters. The request may be sent via a computer network, such as the Internet.

The backend application 512 retrieves this request and retrieves hierarchical data corresponding to the request from a memory 514. The memory 514, may, for example, store hierarchical data in complete tree structure form, while the backend application 512 may prune the complete tree structure to obtain a partial tree structure for the requested hierarchical data. In some example embodiments the backend application 512 requests only the pruned tree, which is returned by the memory 514. In other example embodiments, the backend application 512 requests the complete tree and prunes the complete tree on its own.

The backend application 512 may then form a flattened table corresponding to the partial tree structure by, for example, traversing the partial tree structure depth-first in pre-order. The flattened table may include, for example, for each node in the partial tree structure, an identification of the node and the level at which it resides in the partial tree structure.

The backend application 512 may then, for each entry in the flattened table, calculate a magnitude for the entry, and add that magnitude to the flattened table. As described above, the magnitude for an entry is the number of nodes in the sub-tree of the node corresponding to the entry.

The backend application 512 then sends the flattened table, including the magnitude values, to the client application 506, again via a computer network.

The client application 506 then utilizes the flattened table, which may be stored in memory 508, and specifically the magnitude values in the flattened table, to generate one or more paging parameters in subsequent requests for hierarchical data. For example, if the subsequent request is in response to a collapse or expand navigational operation, the client application 506 can use the magnitude values to request only those nodes/entries that can be displayed, without, for example, needing to request all nodes/entries within a sub-tree or within a level of a sub-tree and then pare down the nodes/entries on the client application 506 side. This greatly improves efficiency.

Figure 6:
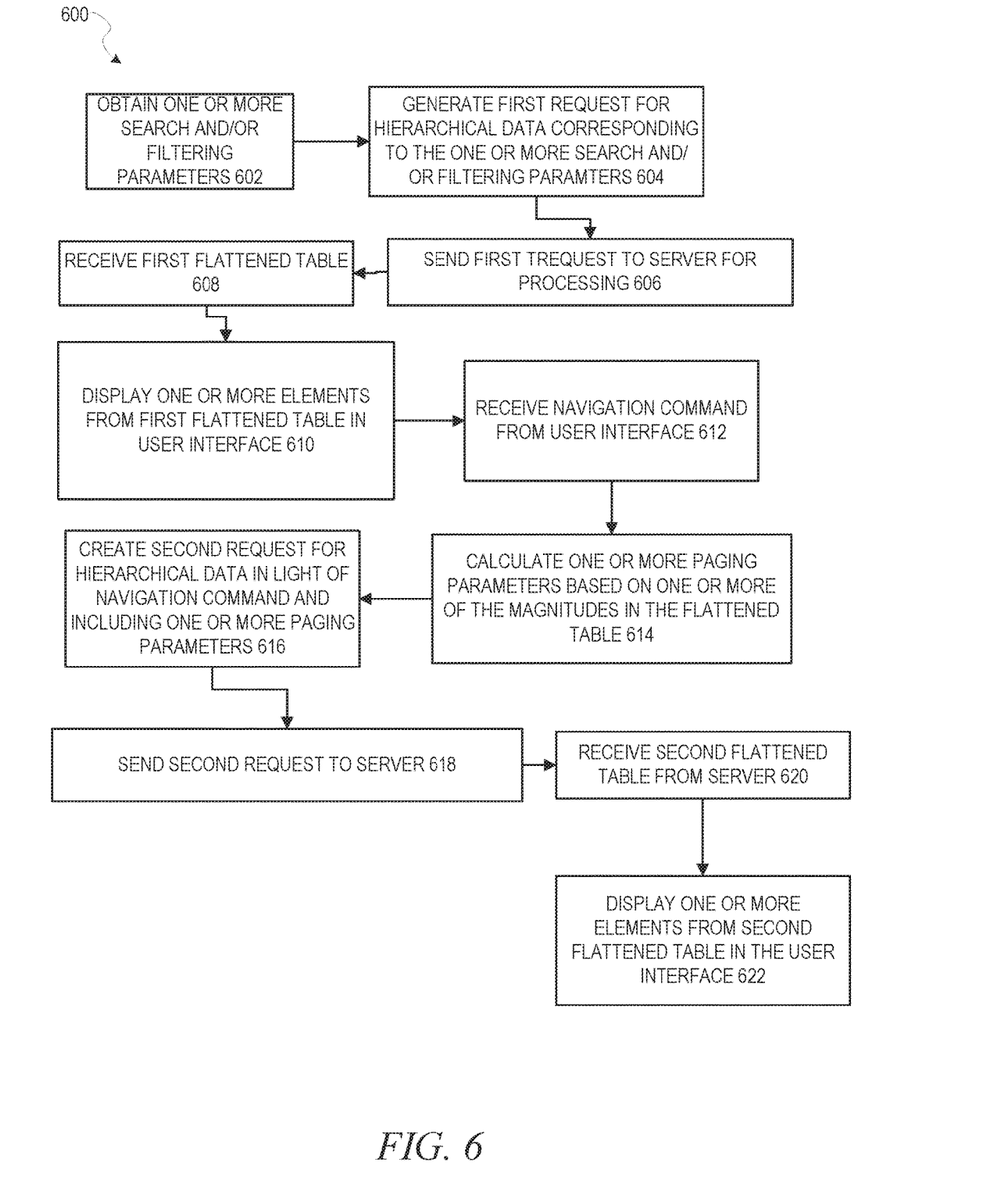
FIG. 6 is a flow diagram illustrating a method of performing a paging algorithm on a client-side in accordance with an example embodiment.

FIG. 6 is a flow diagram illustrating a method 600 of performing a paging algorithm on a client-side in accordance with an example embodiment. At operation 602, one or more search and/or filtering parameters may be obtained. At operation 604, a first request for hierarchical data corresponding to the one or more search and/or filtering parameters is generated. At operation 606, the first request is sent to a server for processing. At operation 608, a first flattened table is received from the server. The flattened table includes one or more entries, ordered based on a pre-order depth-first traversal of a hierarchical tree structure corresponding to a sub-tree satisfying the request. Each entry may include an identification of a corresponding node of the sub-tree, an indication of the level of the node, and a magnitude for the node. The magnitude is calculated as the number of nodes below the node in the sub-tree.

At operation 610, one or more elements from the first flattened table are displayed in a user interface.

At operation 612, a navigation command is received from a user interface. This navigation command may include, for example, a collapse or expand command. At operation 614, one or more paging parameters may be calculated based on the navigation command and based on one or more of the magnitudes in the flattened table. At operation 616, a second request for hierarchical data, in light of the navigation command, including the one or more paging parameters, may be created. At operation 618, the second request is sent to the server. At operation 620, a second flattened table is received from the server. At operation 622, one or more elements from the second flattened table are displayed in the user interface.

It should be noted that it is not necessary for the flattened tables to be maintained by the client device. When a subsequent flattened table is received in response to a subsequent request, the previous flattened table can, if desired, be purged from the client device. In some example embodiments, elements of the previous flattened table are maintained but the magnitude values are not. In this way, the magnitude values are transient, and there is no need to keep them as they become obsolete when the next set of magnitude values are obtained.

EXAMPLES

Example 1

A system comprising:
a processor;
a memory;
a client application configured to:
  generate a first request for hierarchical data:
  send the first request to a backend located on a server device;
  receive, from the server device, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
  create one or more paging parameters based on one or more of the magnitude values;
  generate a second request for hierarchical data based on the one or more paging parameters;
  send the second request to the backend; and
  receive, from the server device, a second flattened table containing hierarchical data responsive to the second request.

Example 2

The system of Example 1, wherein the client application is further configured to, after receiving the first flattened table:
  display information from the first flattened table in a user interface;
  receive, via the user interface, one or more navigation commands; and
  wherein the creating of the one or more paging parameters is further based on the one or more navigation commands.

Example 3

The system of Example 2, wherein the one or more navigation commands includes an expand command.

Example 4

The system of Example 2, wherein the one or more navigation commands includes a collapse command.

Example 5

The system of any of Examples 1-4, wherein the client application is further configured to purge the first flattened table when the second flattened table is received.

Example 6

The system of any of Examples 1-5, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request Example 7. A method comprising:
  generating a first request for hierarchical data;
  sending the first request to a backend located on a server device;
  receiving, from the server device, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
  creating one or more paging parameters based on one or more of the magnitude values;
  generating a second request for hierarchical data based on the one or more paging parameters;
  sending the second request to the backend; and
  receiving, from the server device, a second flattened table containing hierarchical data responsive to the second request.

Example 8

The method of Example 7, further comprising, after receiving the first flattened table:
  displaying information from the first flattened table in a user interface;
  receiving, via the user interface, one or more navigation commands; and
  wherein the creating of the one or more paging parameters is further based on the one or more navigation commands.

Example 9

The method of Example 8, wherein the one or more navigation commands includes an expand command.

Example 10

The method of Example 8, wherein the one or more navigation commands includes a collapse command.

Example 11

The method of any of Examples 7-10, further comprising purging the first flattened table when the second flattened table is received.

Example 12

The method of any of Examples 7-11, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request.

Example 13

The method of any of Examples 7-12, further comprising:
receiving, via a user interface, one or more search and/or filtering commands; and
wherein first request for hierarchical data includes the one or more search and/or filtering commands.

Example 14

A non-transitory machine-readable storage medium comprising instructions, which when implemented by one or more machines, cause the one or more machines to perform operations comprising:
generating a first request for hierarchical data;
sending the first request to a backend located on a server device;
receiving, from the server device, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
creating one or more paging parameters based on one or more of the magnitude values;
generating a second request for hierarchical data based on the one or more paging parameters;
sending the second request to the backend; and
receiving, from the server device, a second flattened table containing hierarchical data responsive to the second request.

Example 15

The non-transitory machine-readable storage medium of Example 14, wherein the operations further comprise, after receiving the first flattened table:
displaying information from the first flattened table in a user interface;
receiving, via the user interface, one or more navigation commands; and
wherein the creating of the one or more paging parameters is further based on the one or more navigation commands.

Example 16

The non-transitory machine-readable storage medium of Example 14, wherein the one or more navigation commands includes an expand command.

Example 17

The non-transitory machine-readable storage medium of Example 14, wherein the one or more navigation commands includes a collapse command.

Example 18

The non-transitory machine-readable storage medium of any of Examples 14-17, wherein the operations further comprise purging the first flattened table when the second flattened table is received.

Example 19

The non-transitory machine-readable storage medium of any of Examples 14-18, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request.

Example 20

The non-transitory machine-readable storage medium of any of Examples 14-19, wherein the operations further comprise:
receiving, via a user interface, one or more search and/or filtering commands; and
wherein first request for hierarchical data includes the one or more search and/or filtering commands.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
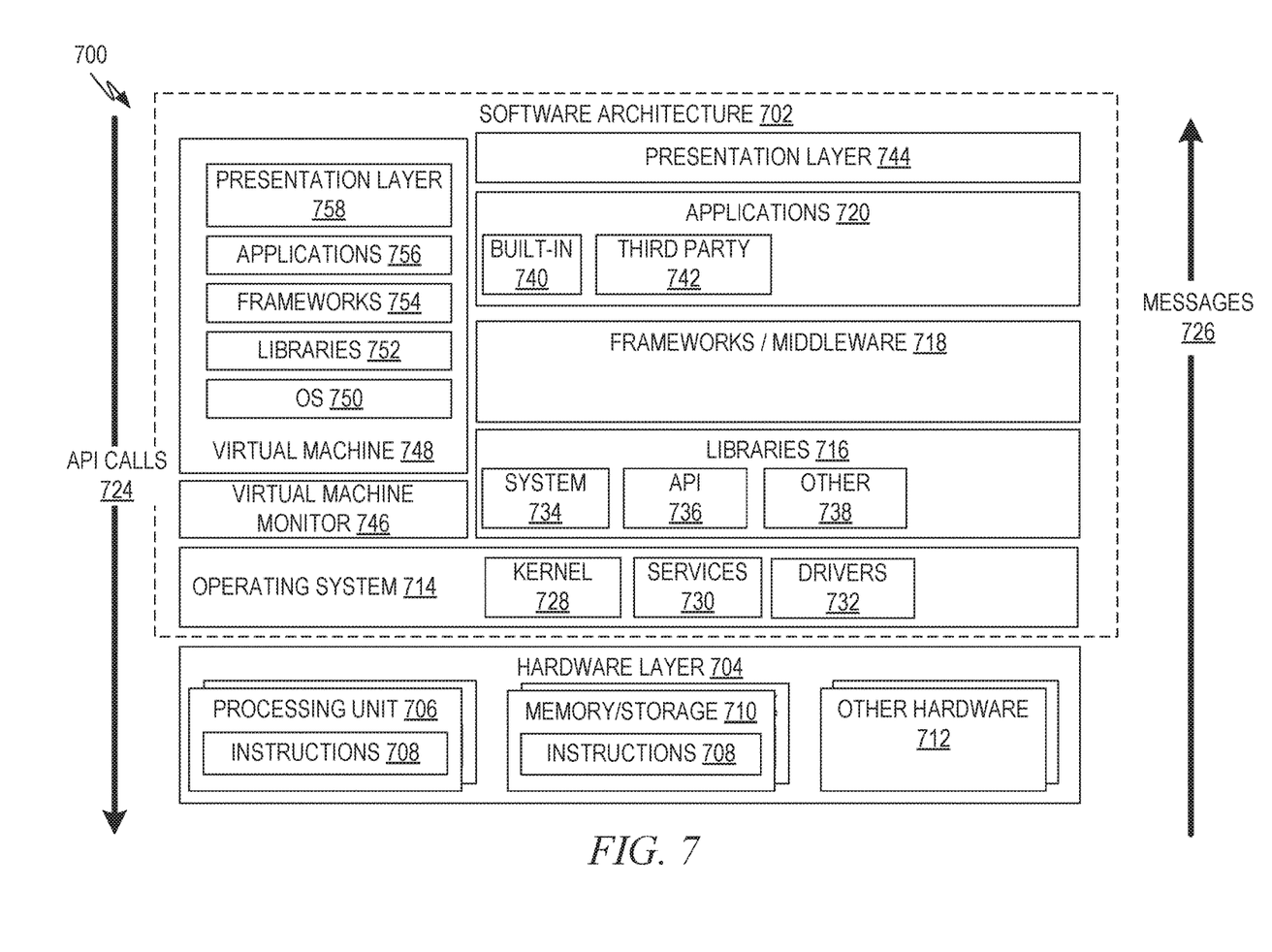
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described. FIG. 7 is merely a non-limiting example of a software architecture, and it will be appreciated that many other architectures may be implemented to facilitate the functionality described herein. The software architecture 702 may be executing on hardware such as a machine 800 of FIG. 8 that includes, among other things, processors 810, memory/storage 830, and I/O components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702, including implementation of the methods, modules, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive responses, returned values, and so forth, illustrated as messages 726, in response to the API calls 724. The layers illustrated are representative in nature and not all software architectures have all layers. For example, some mobile or special purpose operating systems may not provide a layer of frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 742 may invoke the API calls 724 provided by the mobile operating system such as the operating system 714 to facilitate functionality described herein.

The applications 720 may utilize built-in operating system 714 functions (e.g., kernel 728, services 730, and/or drivers 732), libraries 716 (e.g., system libraries 734, API libraries 736, and other libraries 738), and frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware machine (such as the machine 800 of FIG. 8, for example). A virtual machine is hosted by a host operating system (e.g., operating system 714 in FIG. 7) and typically, although not always, has a virtual machine monitor 746, which manages the operation of the virtual machine 748 as well as the interface with the host operating system (e.g., operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Example Machine Architecture and Machine-Readable Medium

Figure 8:
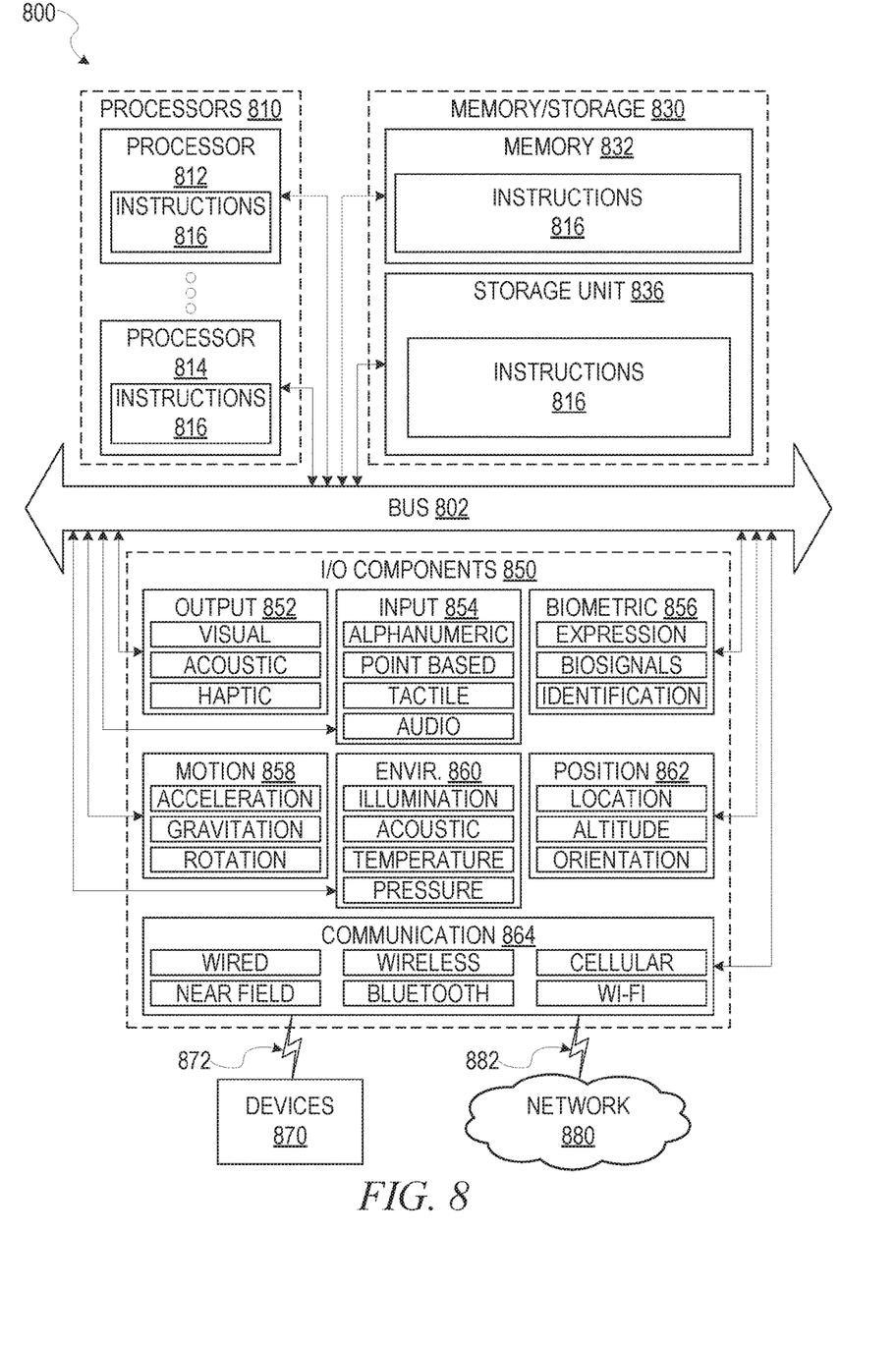
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/ storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 80X to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth®) components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi®) signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor;
a memory;
a client application including instructions stored in the memory that cause the processor to:
generate a first request for hierarchical data;
send, via a network, the first request to a backend located on a server device;
receive, from the server device via the network, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
create one or more paging parameters based on one or more of the magnitude values;
generate a second request for hierarchical data based on the one or more paging parameters;
send the second request to the backend via the network; and
receive, from the server device via the network, a second flattened table containing hierarchical data responsive to the second request.

2. The system of claim 1, wherein the client application is further configured to, after receiving the first flattened table:
display information from the first flattened table in a user interface;
receive, via the user interface, one or more navigation commands; and
wherein the creating of the one or more paging parameters is further based on the one or more navigation commands.

3. The system of claim 2, wherein the one or more navigation commands includes an expand command.

4. The system of claim 2, wherein the one or more navigation commands includes a collapse command.

5. The system of claim 1, wherein the client application is further configured to purge the first flattened table when the second flattened table is received.

6. The system of claim 1, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request.

7. A computerized method comprising:
generating, using a hardware processor, a first request for hierarchical data;
sending, via a network, the first request to a backend located on a server device;
receiving, from the server device via the network, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
creating, using the hardware processor, one or more paging parameters based on one or more of the magnitude values;
generating, using the hardware processor, a second request for hierarchical data based on the one or more paging parameters;
sending the second request to the backend via the network; and
receiving, from the server device via the network, a second flattened table containing hierarchical data responsive to the second request.

8. The method of claim 7, further comprising, after receiving the first flattened table:
displaying information from the first flattened table in a user interface;
receiving, via the user interface, one or more navigation commands; and
wherein the creating of the one or more paging parameters is further based on the one or more navigation commands.

9. The method of claim 8, wherein the one or more navigation commands includes an expand command.

10. The method of claim 8, wherein the one or more navigation commands includes a collapse command.

11. The method of claim 7, further comprising purging the first flattened table when the second flattened table is received.

12. The method of claim 7, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request.

13. The method of claim 7, further comprising:
receiving, via a user interface, one or more search and/or filtering commands; and
wherein the first request for hierarchical data includes the one or more search and/or filtering commands.

14. A non-transitory machine-readable storage medium comprising instructions, which when implemented by one or more machines, cause the one or more machines to perform operations comprising:
generating a first request for hierarchical data;
sending the first request to a backend located on a server device;
receiving, from the server device, a first flattened table containing hierarchical data responsive to the first request, the first flattened table containing a plurality of entries, each entry corresponding to a node in a sub-tree of hierarchical data responsive to the first request, and, for each of the plurality of entries, a magnitude value indicating a number of nodes underneath the node corresponding to the entry, in the sub-tree;
creating one or more paging parameters based on one or more of the magnitude values;

generating a second request for hierarchical data based on the one or more paging parameters;

sending the second request to the backend; and receiving, from the server device, a second flattened table containing hierarchical data responsive to the second request.

15. The non-transitory machine-readable storage medium of claim 14, wherein the operations further comprise, after receiving the first flattened table:

displaying information from the first flattened table in a user interface;

receiving, via the user interface, one or more navigation commands; and wherein the creating of the one or more paging parameters is further based on the one or more navigation commands.

16. The non-transitory machine-readable storage medium of claim 15, wherein the one or more navigation commands includes an expand command.

17. The non-transitory machine-readable storage medium of claim 15, wherein the one or more navigation commands includes a collapse command.

18. The non-transitory machine-readable storage medium of claim 14, wherein the operations further comprise purging the first flattened table when the second flattened table is received.

19. The non-transitory machine-readable storage medium of claim 14, wherein the second flattened table contains hierarchical data responsive to the second request, the second flattened table containing a second plurality of entries, each entry in the second plurality of entries corresponding to a node in a sub-tree of hierarchical data responsive to the second request, and, for each of the second plurality of entries, a magnitude value indicating a number of nodes underneath the node corresponding to the entry, in the sub-tree of hierarchical data responsive to the second request.

20. The non-transitory machine-readable storage medium of claim 14, wherein the operations further comprise:

receiving, via a user interface, one or more search and/or filtering commands; and wherein the first request for hierarchical data includes the one or more search and/or filtering commands.

\* \* \* \* \*